(12) United States Patent
He

(10) Patent No.: US 10,241,288 B2
(45) Date of Patent: Mar. 26, 2019

(54) FIBER OPTIC ADAPTER FOR PROOFING DUST AND LIGHT

(71) Applicant: HYC Co., Ltd., Qingyuan (CN)

(72) Inventor: Yong He, Qingyuan (CN)

(73) Assignee: Hyc Co., Ltd., Qingyuan (CN)

(*) Notice: Subject to any disclaimer, the term of this patent is extended or adjusted under 35 U.S.C. 154(b) by 0 days.

(21) Appl. No.: 15/855,491

(22) Filed: Dec. 27, 2017

(65) Prior Publication Data

US 2019/0064464 A1 Feb. 28, 2019

(30) Foreign Application Priority Data

Aug. 29, 2017 (CN) .......................... 2017 1 0755856

(51) Int. Cl.
*G02B 6/44* (2006.01)
*G02B 6/38* (2006.01)

(52) U.S. Cl.
CPC ......... *G02B 6/4453* (2013.01); *G02B 6/3874* (2013.01); *G02B 6/3893* (2013.01)

(58) Field of Classification Search
None
See application file for complete search history.

(56) References Cited

U.S. PATENT DOCUMENTS

| | | | | |
|---|---|---|---|---|
| 7,029,322 B2 * | 4/2006 | Ernst | .................... | G02B 6/3897 385/56 |
| 7,340,146 B2 * | 3/2008 | Lampert | .............. | G02B 6/3849 385/134 |
| 7,542,732 B2 * | 6/2009 | Ka | ........................ | G02B 6/4201 385/139 |
| 7,661,887 B2 * | 2/2010 | Nakagawa | ........... | G02B 6/4296 385/70 |
| 7,686,518 B2 * | 3/2010 | Case | .................... | G02B 6/3825 385/139 |
| 7,785,018 B2 * | 8/2010 | Jones | ................... | G02B 6/3849 385/58 |
| 7,837,395 B2 * | 11/2010 | Lin | ....................... | G02B 6/3825 385/134 |
| 9,086,554 B2 * | 7/2015 | Scea | .................... | G02B 6/3849 |
| 9,196,997 B2 * | 11/2015 | Sanders | ............... | G02B 6/3849 |
| 9,494,746 B2 * | 11/2016 | Sanders | ............... | G02B 6/3825 |

* cited by examiner

*Primary Examiner* — Tina M Wong
(74) *Attorney, Agent, or Firm* — Gregory L. Porter; Hunton Andrews Kurth LLP

(57) ABSTRACT

Provided is a fiber optic adapter for proofing dust and light. The fiber optic adapter includes an adapter body and a lightproof plate assembly. The adapter body includes a body portion and a cover. The body portion has a concave space provided with openings in two directions. The cover is engaged to the body portion and closes one opening of the concave space to form a port provided with one opening. The lightproof plate assembly includes a lightproof plate. Every two adjacent ports on a same side share one lightproof plate. A first end of the lightproof plate is provided with a rotation shaft. Inner walls of two adjacent ports sharing one lightproof plate are provided with a rotation slot. The rotation slot is provided from a side of the body portion facing the cover to a direction away from the cover.

9 Claims, 10 Drawing Sheets

FIBER OPTIC ADAPTER FOR PROOFING DUST AND LIGHT

CROSS-REFERENCES TO RELATED APPLICATIONS

This application claims priority to Chinese patent application No. CN201710755856.3, filed on Aug. 29, 2017, the disclosure of which is incorporated herein by reference in its entirety.

TECHNICAL FIELD

The present disclosure relates to a fiber optic adapter and, in particular, to a fiber optic adapter for proofing dust and light.

BACKGROUND

Fiber optic adapters are widely used in the field of optical fiber connection equipment. Two ends of the fiber optic adapter can be plugged into fiber optic connectors of different interface types to achieve conversion among various interfaces such as FC, SC, ST, LC, MTRJ, MPO and E2000. To facilitate the connection between the connectors at the two ends and the adapter, the fiber optic adapter is connected to the fiber optic connectors via ports, a sleeve is provided between opposite ports, each of the fiber optic connectors at the two ends of the fiber optic adapter is inserted into a corresponding port, and optical fibers at the heads of the fiber optic connectors are respectively inserted into the fiber optic adapter from the two ends of the sleeve and are aligned by the sleeve to avoid optical fiber dislocation and to reduce losses.

In the related art, to proof dust and light, the fiber optic adapter is provided with a lightproof plate. The lightproof plate typically can rotate in the port so as to avoid an inserted fiber optic connector when the fiber optic connector is inserted and to cover the port when the fiber optic connector is pulled out. In order to mount the lightproof plate, the fiber optic adapter is divided into a body portion and an external clamping portion in an opening direction of the port. The lightproof plate is mounted on a side of the body portion near the port, and the external clamping portion is pressed in, such that the lightproof plate is fixed. In this structure, the body portion and the external clamping portion are clamped in the opening direction of the port, so the external clamping portion protrudes into the port and causes a smaller space in the port.

In addition, a cover is separated, on a port side, from the adapter body of the fiber optic adapter. In this case, the lightproof plate is mounted into the port, the cover covers the side of the port, and then a metal frame is fitted to the adapter body on which the cover has been mounted so as to fix the cover to the adapter body. This type of fixation requires use of the additional metal frame for fixation, not only being inconvenient for fixation, but also increasing the number of components and increasing the complexity of the assembly process.

SUMMARY

The present disclosure provides a fiber optic adapter for proofing dust and light capable of preventing dust and light with a lightproof plate. The fiber optic adapter is easily assembled and does not affect the internal space of a port.

A fiber optic adapter for proofing dust and light includes an adapter body and a lightproof plate assembly.

The adapter body includes: a body portion and a cover.

The body portion is recessed to form a concave space provided with openings in two directions.

The cover is engaged to the body portion and closes one of the openings of the concave space to form a port provided with an opening. A plurality of ports are disposed opposite on two sides of the adapter body and the port is configured to connect to an fiber optic connector.

The lightproof plate assembly includes a lightproof plate configured to open and close respective two adjacent ones of the plurality of ports on a same side of the adapter body. The respective two adjacent ports share the lightproof plate. A first end of the lightproof plate is provided with a rotation shaft. The respective two adjacent ports are paired ports. Each of opposite inner walls of the paired ports are provided with a rotation slot adapted to the rotation shaft, the lightproof plate rotates around the rotation shaft to open or close the paired ports, the rotation slot is provided from a side of the body portion facing the cover, towards a direction away from the cover, and the cover covers the rotation slot.

Figure 1:
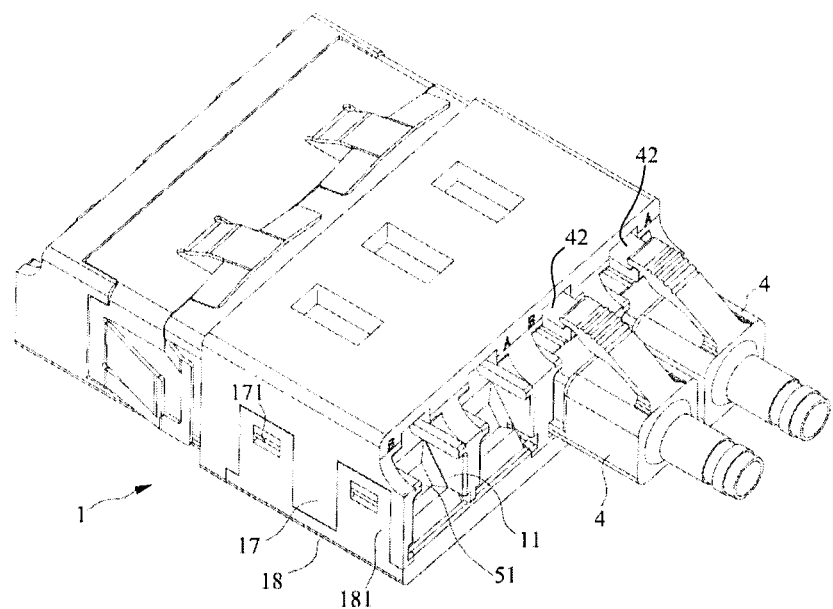
FIG. 1 is structural diagram of a fiber optic adapter from an angle according to the present disclosure.
Figure 2:
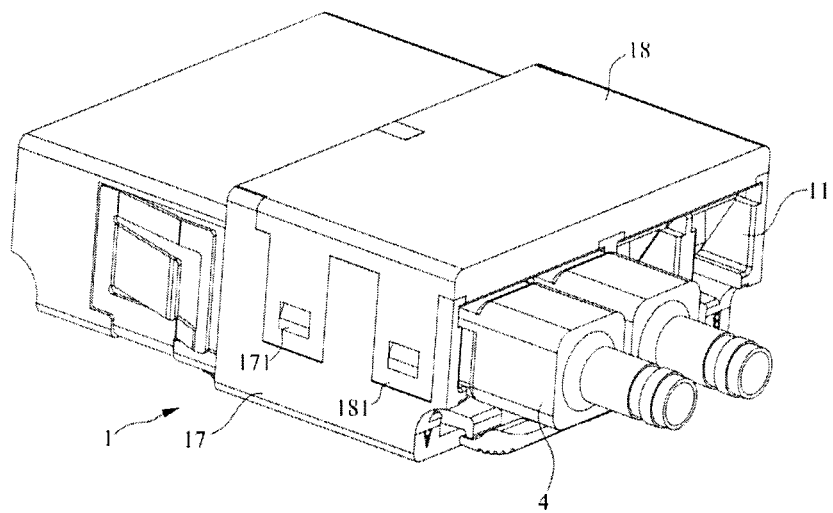
FIG. 2 is structural diagram of the fiber optic adapter from another angle according to the present disclosure.
Figure 3:
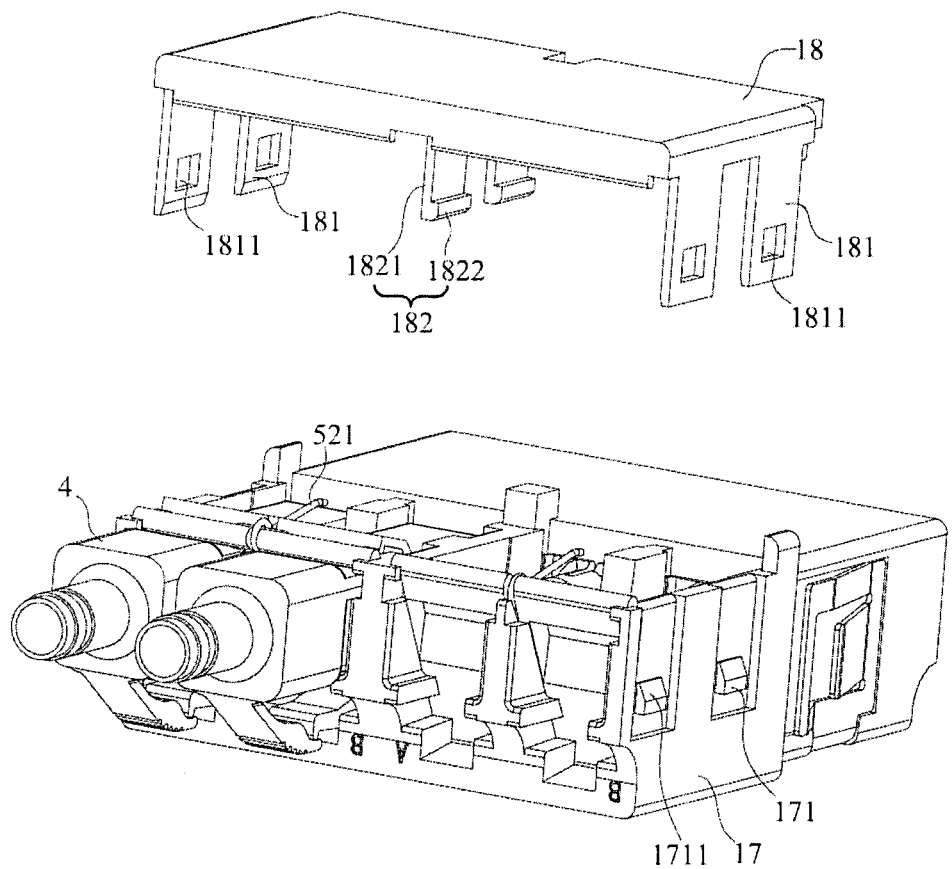
FIG. 3 is exploded view of the fiber optic adapter from an angle according to the present disclosure.

Reference numerals list: 1—adapter body, 11—port, 12—sleeve hole, 121—first barb portion, 13—lock sleeve clamping area, 14—recess, 15—partition plate, 151—avoiding area, 161—rotation slot, 162—accommodating slot, 17—body portion, 171—first buckling portion, 1711—guide surface, 18—cover, 181—first clamping portion, 1811—clamping hole, 182—second clamping portion, 1821—elastic arm, 1822—hook, 19—spacer plate, 191—second buckling portion, 1911—first accommodating area, 1912—second accommodating area, 2—sleeve, 3—lock sleeve, 31—lock hole, 311—second barb portion, 312—partition slot, 32—lock sleeve clamping portion, 321—tilt arm, 322—bending slot, 4—fiber optic connector, 41—optical fiber, 42—protrusion, 5—lightproof plate assembly, 51—lightproof plate, 511—rotation shaft, 512—sleeve shaft, 513—limiting slot, 514—limiting hole, 52—elastic needle, 521—elastic end

DETAILED DESCRIPTION

To make solved problems, adopted solutions and achieved effects of the present disclosure clearer, the solution of the present disclosure is further described in conjunction with accompanying drawings and through embodiment.

Figure 4:
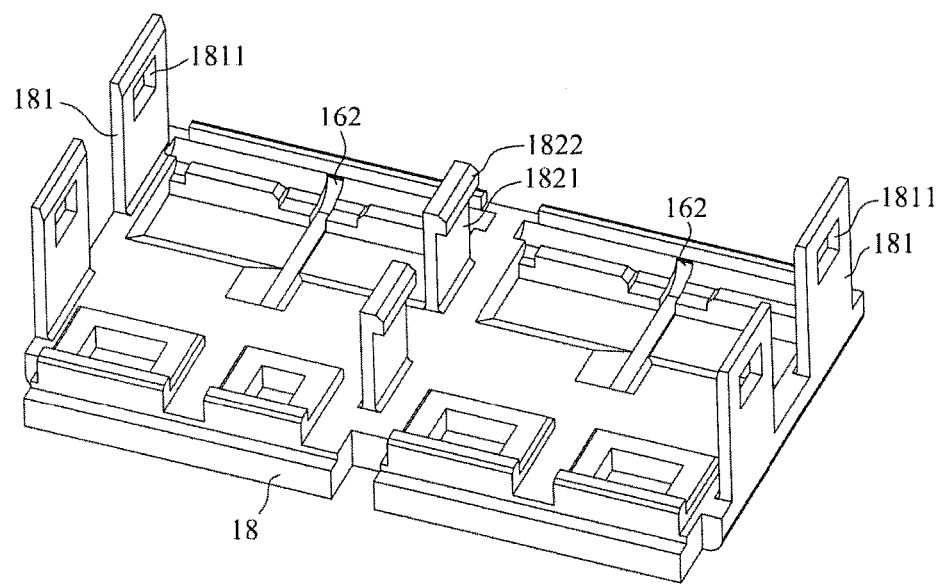
FIG. 4 is a structural diagram of a cover of the fiber optic adapter according to the present disclosure.
Figure 5:
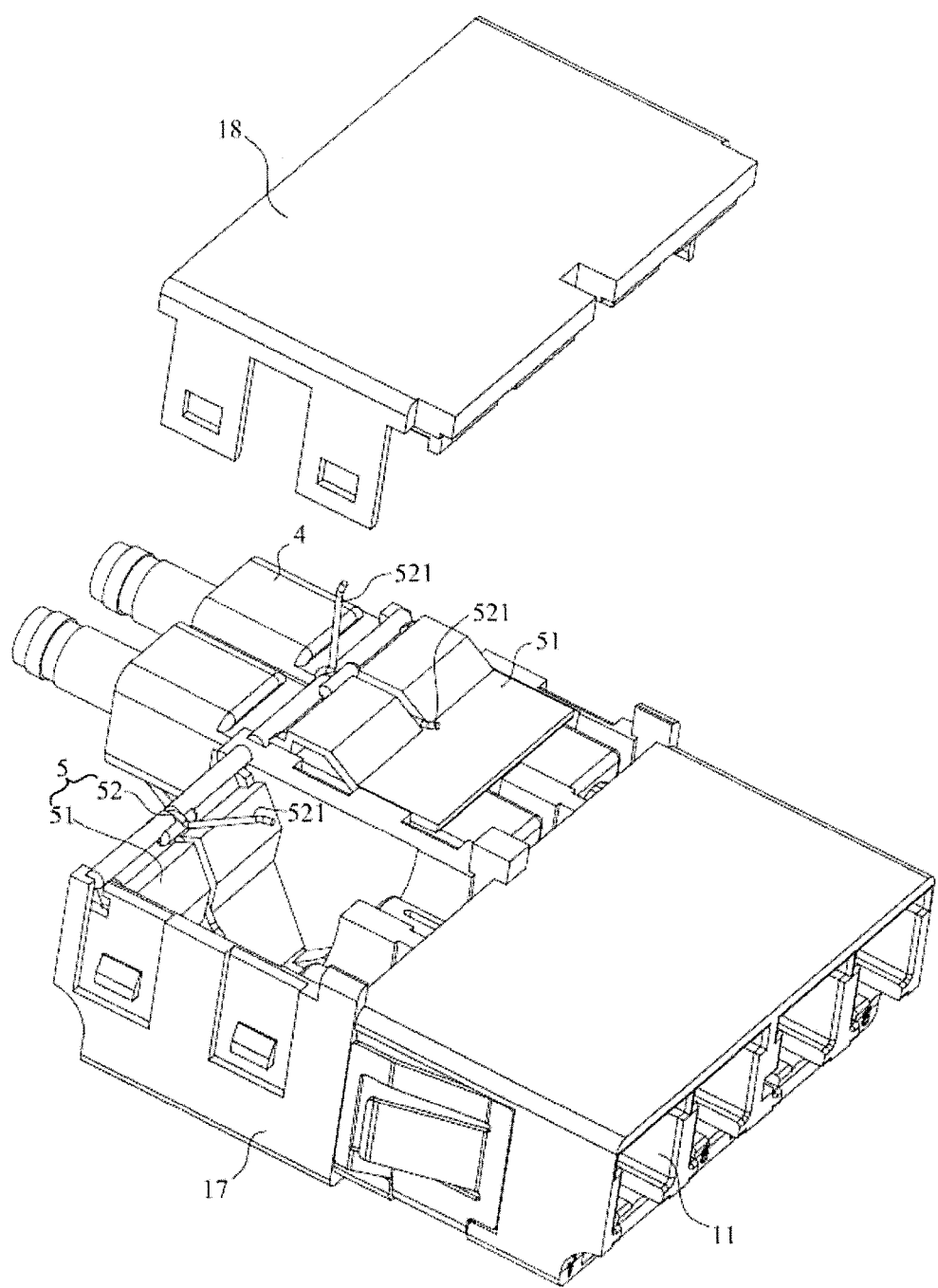
FIG. 5 is exploded view of the fiber optic adapter from another angle according to the present disclosure.

As illustrated in FIGS. 1 to 15, the present embodiment provides a fiber optic adapter for proofing dust and light. Specifically, the fiber optic adapter for proofing dust and light includes an adapter body 1 and a lightproof plate assembly 5. The adapter body 1 includes a body portion 17 and a cover 18. The body portion 17 is configured to form a concave space provided with openings in two directions. The cover 18 is engaged with the body portion 17 and closes one of the openings of the concave space to form a port 11 provided with an opening. A plurality of ports 11 are provided on two sides of the adapter body 1. The ports 11 are configured to be connected to fiber optic connectors 4. The lightproof plate assembly 5 includes a lightproof plate 51 capable of closing and opening the port 11. Every two adjacent ports on a same side share one lightproof plate 51. In at least one embodiment, each side of the fiber optic adapter has 4 ports 11, and every two adjacent ports 11 share one lightproof plate 51. FIG. 5 illustrates two lightproof plates 51. Fiber optic connectors 4 are inserted into ports 11 corresponding to one of the two lightproof plate 51. Therefore, this lightproof plate 51 opens the ports 11. Ports 11 corresponding to the other one of two lightproof plate 51 are idle and thus closed to prevent external dust and light from entering the fiber optic adapter. Two ports 11 of the fiber optic adapter of the present embodiment are shield at the same time by one lightproof plate 51. It is no longer necessary to provide one lightproof plate 51 for each port individually, reducing the number of lightproof plates 51. More importantly, such configuration reduces assembly time of the fiber optic adapter, improves the assembly efficiency, and greatly reduces the costs of manual assembly. Moreover, usually every two ports 11 of the fiber optic adapter are used cooperatively, and therefore it is generally impossible to use only one of the ports 11 to cause the other port 11 to be opened and polluted.

A first end of the lightproof plate 51 is provided with a rotation shaft 511. Two adjacent ports 11 sharing one lightproof plate 51 are paired ports. Opposite inner walls of the paired ports are respectively provided with a rotation slot 161 adapted to the rotation shaft 151. The lightproof plate 51 rotates around the rotation shaft 511 to open or close the paired ports. The rotation slot 161 is provided from a side of the body portion 17 facing the cover 18 in a direction away from the cover 18. The cover 18 covers the rotation slot 161.

When the lightproof plate 51 is mounted, the lightproof plate 51 can be loaded through the opening capable of being closed by the cover 18, and then the cover 18 and the body portion 17 are engaged to close the opening. The mounting process is simple. The cover 18 and the body portion 17 are assembled by engagement. Such mounting is simple, enables the cover 18 to be securely fixed to the body portion 17 and does not require additional fixed structures. Furthermore, the cover 18 is engaged with one side of the body portion 17 rather than encloses a frame and then fitted to the body portion 17. Therefore, a thickness of an engaging portion of the cover 18 can be greater, and a material of the cover is not limited, expanding material selection space. In the present embodiment, the body portion 17 is integrally formed, ensuring a structural strength of the body portion 17. The body portion 17 and the cover 18 are made from the same material, e.g., plastic, and thus can be formed by injection molding. The body portion 17 and the cover 18 have the same color so that a color of the entire adapter body 1 is uniform when the cover 18 is clamped to the body portion 17.

In the present embodiment, two adjacent ports 11 sharing one lightproof plate are separated by a partition plate 15. The partition plate 15 is provided with an avoiding area 151. A middle part of the lightproof plate 51 is located at the partition plate 15. Each of two sides of the lightproof plates 51 is located inside a respective one of the two ports 11. The avoiding area 151 is adapted to a motion track of an end of the lightproof plate 51 to avoid interfering with the lightproof plate 51. Specifically, the lightproof plate 51 in the present embodiment is rotated in the port 11, and therefore, the avoiding area 151 is arc-shaped.

As illustrated in FIG. 5, the lightproof plate assembly 5 further includes an elastic needle 52. The elastic needle 52 has two elastic ends 521. The lightproof plate 51 is rotatably connected to the adapter body 1. One of the two elastic ends 521 abuts against the lightproof plate 51, and the other one of the two elastic ends 521 abuts against an inner wall of the adapter body 1, so that the port is closed by the lightproof plate 51. In FIG. 5, the two elastic ends 521 of the elastic needle 52 are in a free open state. After actual assembled, an upstanding elastic end 521 abuts against the inner wall of the adapter body 1 (here, an inner wall of the cover 18). When the port 11 is idle, the elastic needle 52 presses the lightproof plate 51 to a closed state. When the fiber optic connector 4 is inserted into the port 11, the lightproof plate 51 is pressed to an open state and the two elastic ends 521 of the elastic needle 52 are brought closer to each other.

Figure 9:
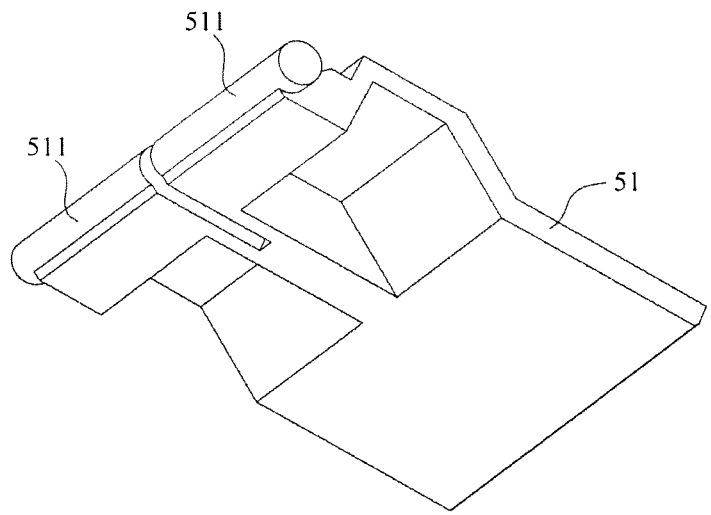
FIG. 9 is structural diagram of a lightproof plate of the fiber optic adapter from an angle according to the present disclosure.
Figure 10:
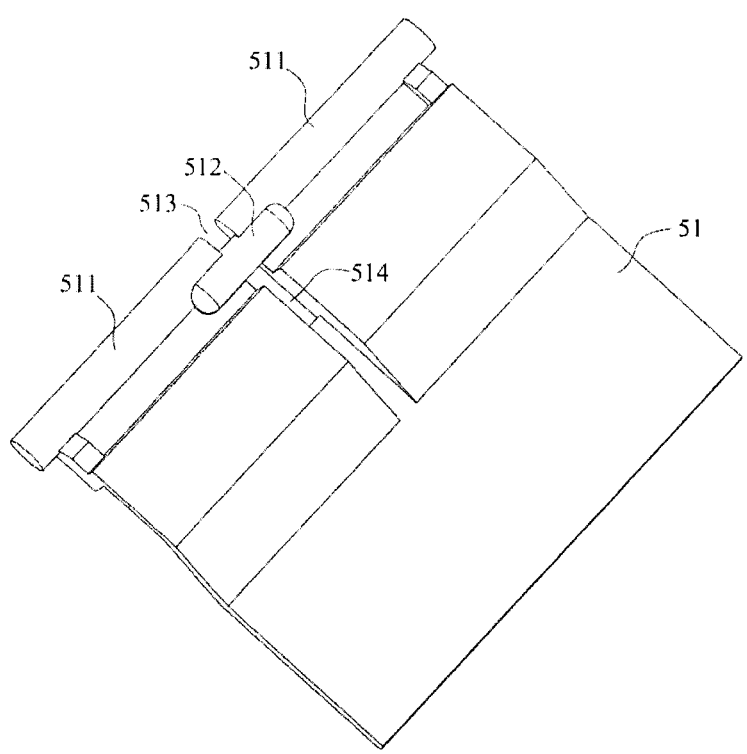
FIG. 10 is structural diagram of the lightproof plate of the fiber optic adapter from another angle according to the present disclosure.
Figure 11:
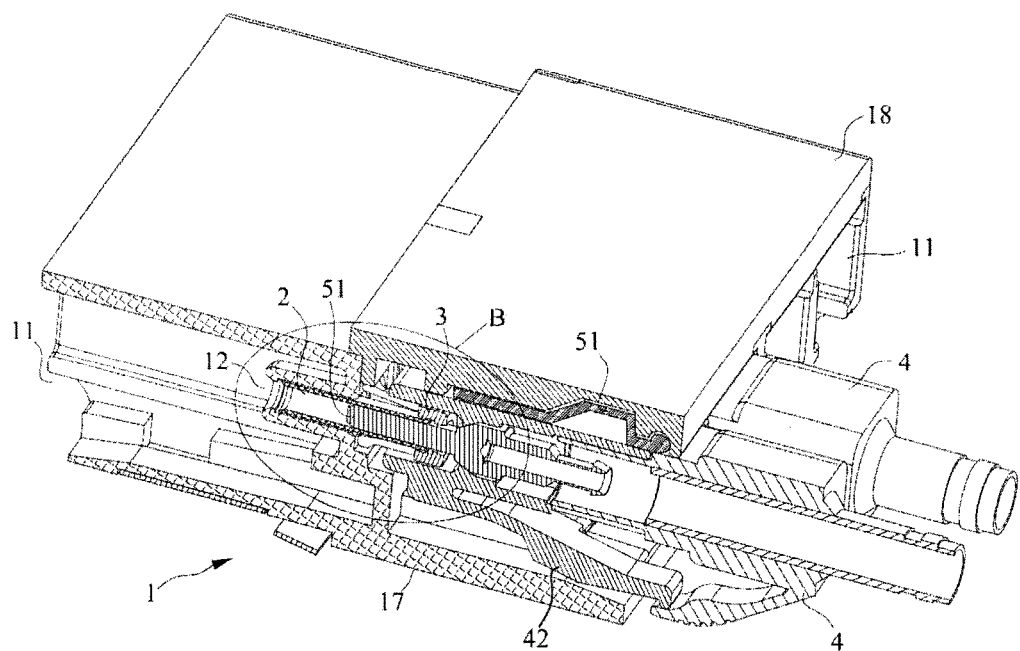
FIG. 11 is sectional view 1 of the fiber optic adapter taken along a line according to the present disclosure.
Figure 12:
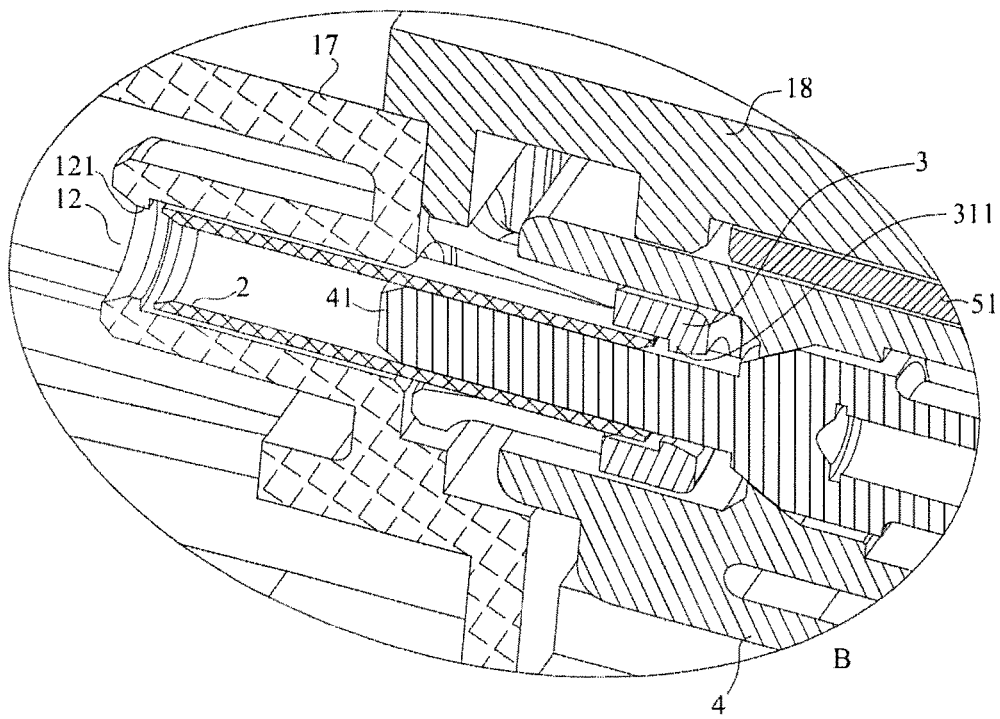
FIG. 12 is a partial enlarged view of a part B of FIG. 11.
Figure 13:
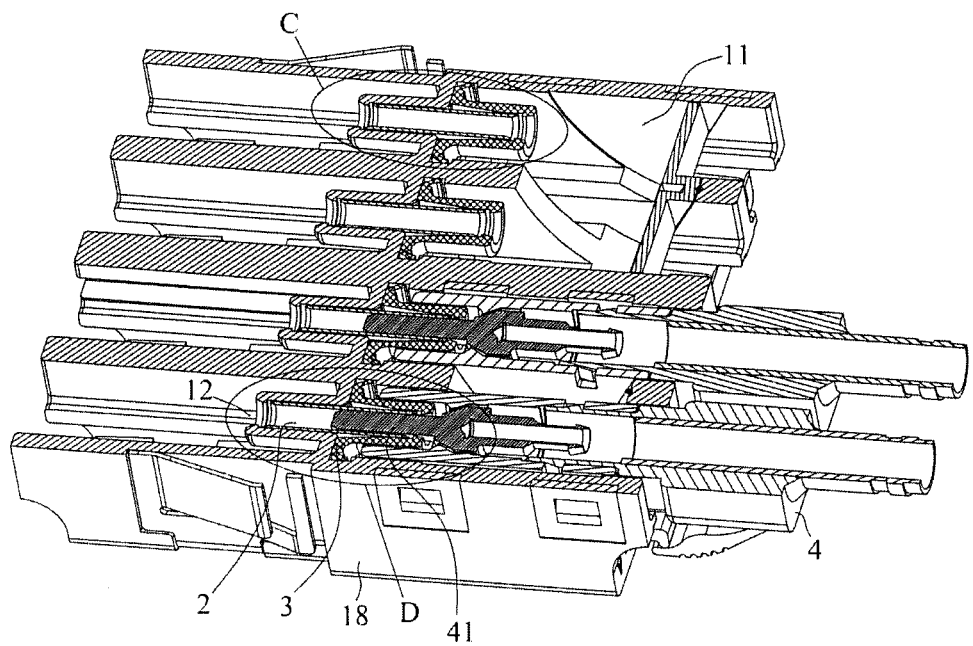
FIG. 13 is sectional view 2 of the fiber optic adapter taken along another line according to the present disclosure.
Figure 14:
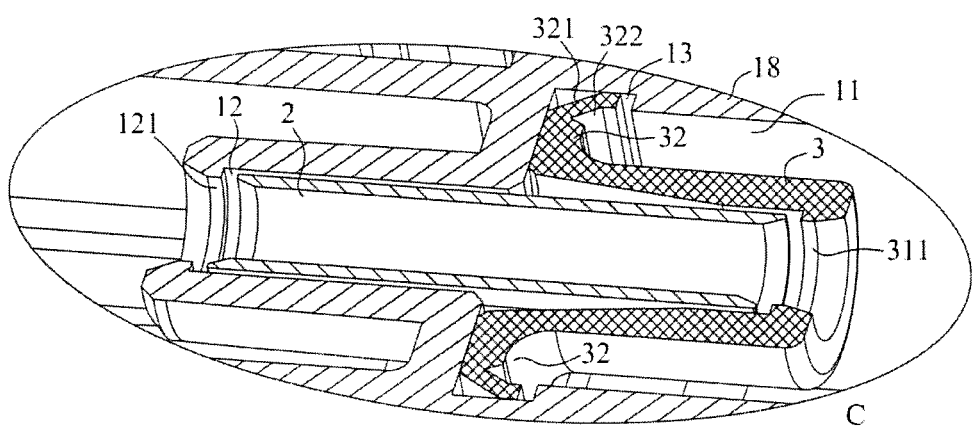
FIG. 14 is a partial enlarged view of a part C of FIG. 13.
Figure 15:
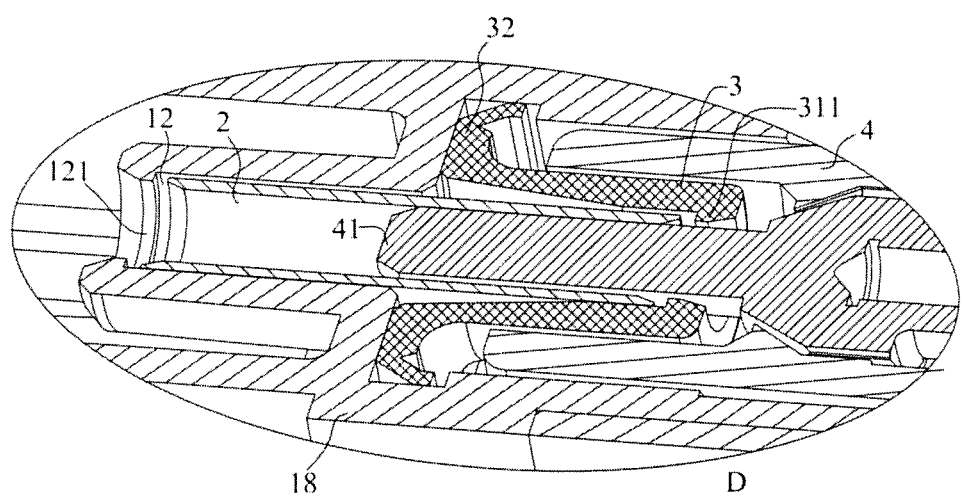
FIG. 15 is a partial enlarged view of a part D of FIG. 13.

In the present embodiment, a middle part of the elastic needle 52 is arc-shaped, so that the two elastic ends 521 of the elastic needle 52 can keep open. As illustrated in FIGS. 5, 9 and 10, in the present embodiment, a through slot is provided from the first end of the lightproof plate 51 towards inside and goes through the lightproof plate 51. The through slot is transversely provided with an sleeve shaft 512. The through slot is divided by the sleeve shaft 512 into a limiting slot 513 closer to the first end and a limiting hole 514 farther from the first end. The middle part of the elastic needle 52 encloses the sleeve shaft 512 and is accommodated in the limiting slot 513. The arc-shaped middle part of the elastic needle 52 also facilitates rotation after the middle part of the elastic needle 52 encloses the sleeve shaft 512. One elastic end 521 of the elastic needle 52 protrudes from the limiting hole 514 and abuts against the lightproof plate 51. Another elastic end 521 of the elastic needle 52 abuts against the inner wall of the adapter body 1. The limiting hole 514 may confine the position of the elastic end 521 passing through. After the middle part of the elastic needle 52 encloses the sleeve shaft 512, the limiting slot 513 confines the elastic needle 52. The limiting slot 513 and the limiting hole 514 can well confine the elastic needle 52. Moreover, the elastic needle 52 can be hidden in the limiting slot 513 to avoid being exposed outside the rotation shaft 511 and interfering with the inner wall of the adapter body 1. Moreover, as illustrated in FIG. 4, the inner wall of the adapter body 1 is provided with corresponding accommodating slots 162 at a position of the elastic end 521 and a position of the sleeve shaft 512. In the present embodiment, the cover 18 of the adapter body 1 covers the lightproof plate 51, so the accommodating slots 162 are on an inner surface of the cover 18. The accommodating slots 162 can not only further confine the elastic end 521, but can also avoid interference between the elastic needle 52 and the cover 18. In the present embodiment, the through slot is located at a position corresponding to the partition plate 15. Therefore, the elastic needle 52 is also located at the partition plate 15 to press the lightproof plate 51 from the middle, facilitating uniform force applied to the lightproof plate 51 and not occupying a space of the port 11.

In the present embodiment, the fiber optic connector 4 is provided with a compressible and recoverable protrusion 42. A side wall of the port 11 is provided with a recess 14 for accommodating the protrusion 42, and the recess 14 does not go through the side wall of the port 11. After the adapter body 1 is disassembled into the cover 18 and the body portion 17, the cover 18 and the body portion 17 are not configured in frame structures, but similar to semi-closed structures. Therefore, at the time of injection molding, the recess 14 which does not go through the inner wall can be provided internally, so that the recess 14 of the adapter body 1 does not go through the inner wall and does not form a through hole, without additionally using a metal frame for fixation. Such arrangement saves costs and facilitates assembly. Each concave space has two openings, and when the cover 18 covers one of the openings from outside to form a port 11, space inside the port 11 is not affected. The cover 18 is engaged with the body portion 17, ensuring simple assembly and firm fixation between the cover 18 and the body portion 17.

To realize the engagement between the cover 18 to the body portion 17, the cover 18 includes a cover body portion and first clamping portions 181 protruding from two sides of the cover body portion. The body portion 17 is provided with first buckling portions 171 on outer walls of two sides of the concave space. The cover body portion closes the opening, and the first clamping portions 181 are clamped to the first buckling portions 171. Specifically, a clamping hole 1811 is provided on the first clamping portion 181. The first buckling portion 171 protrudes from the outer wall of the body portion 17. A guide surface 1711 is provided on a side of the first buckling portion 171 near the cover 18 to facilitate clamping of the first clamping portion 181. When the first clamping portion 181 is clamped towards the body portion 17, the first clamping portion 181 is gradually opened along the guide surface 1711 until the clamping hole 1811 is clamped to the first buckling portion 171. The guide surface 1711 can guide the first clamping portion 181 to be opened, facilitating completion of the clamping process. The first buckling portions 171 and the first clamping portions 181 arranged on two sides ensure balanced force between the two sides of the cover 18 and the body portion 17. To further maintain the balanced force, the first clamping portions 181 on the two sides of the body portion 17 may be symmetrically disposed. To enhance clamping between the body portion 17 and the cover 18, two or more first clamping portions 181 may be disposed on each side of the body portion 17.

Figure 6:
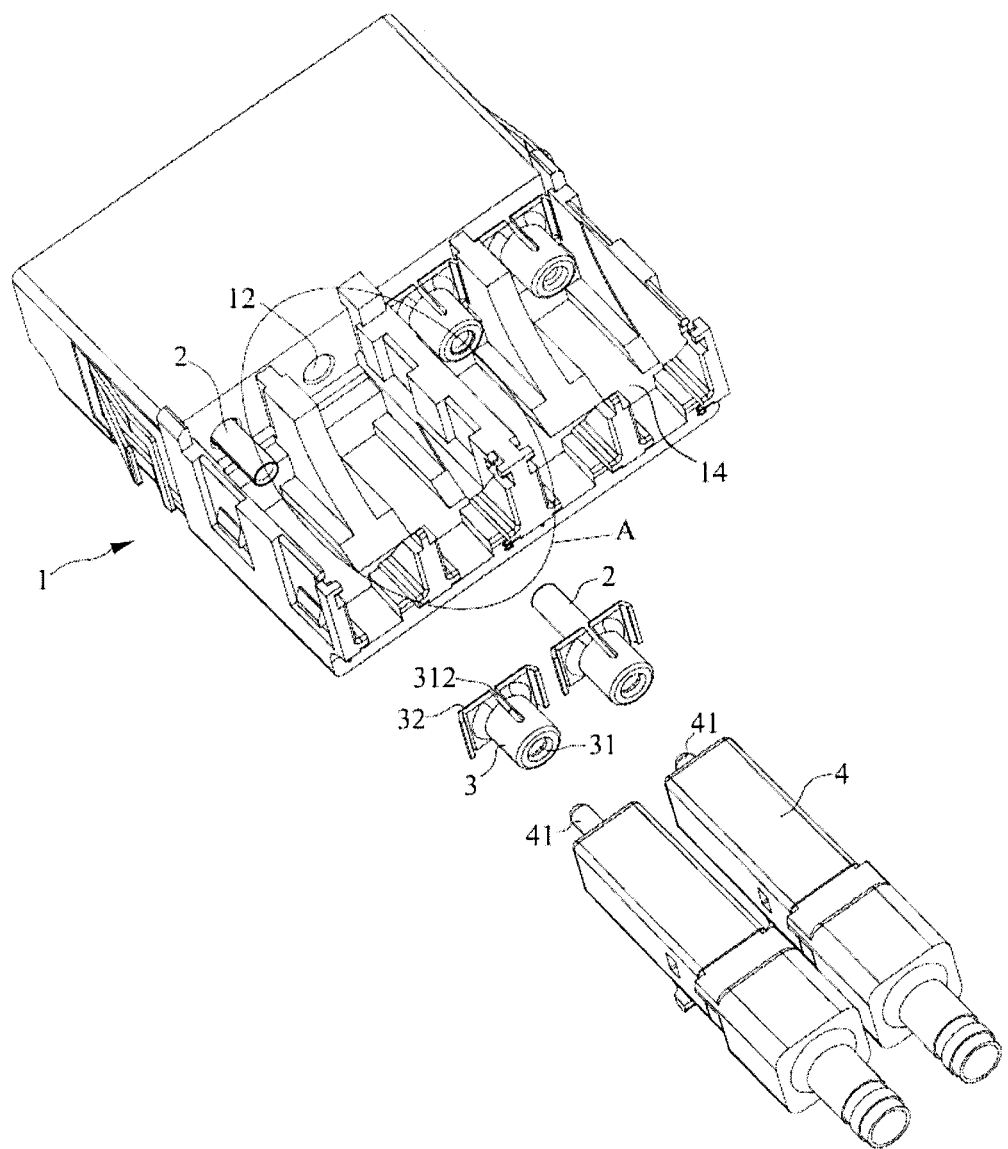
FIG. 6 is an exploded view of an adapter body (with the cover hidden), a lock sleeve and a sleeve of the fiber optic adapter and the fiber optic adapter according to the present disclosure.
Figure 7:
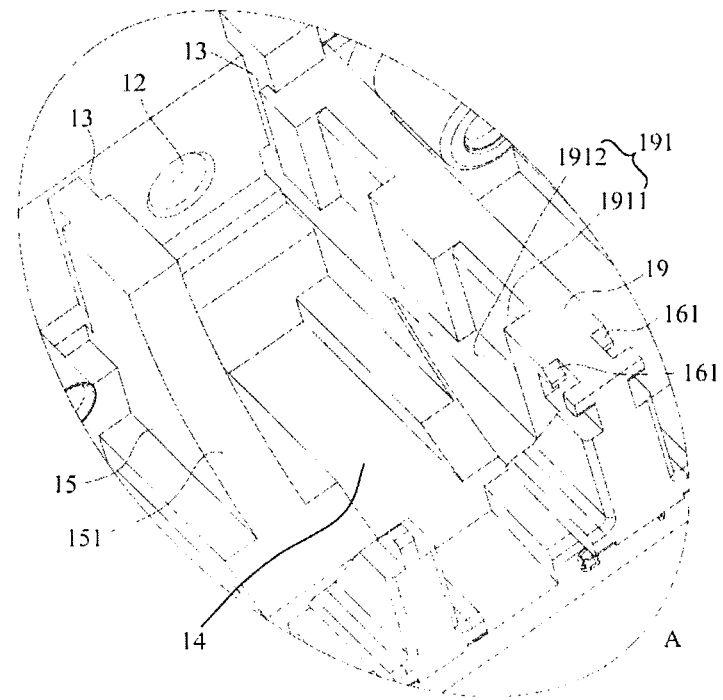
FIG. 7 is a partial enlarged view of a part A of FIG. 6.

As illustrated in FIGS. 4, 6 and 7, in the present embodiment, multiple concave spaces are provided on a side of the adapter body 1. Adjacent concave spaces are separated by a spacer plate 19. The cover body portion closes openings of the multiple concave spaces to form multiple ports 11. The spacer plate 19 is provided with a second buckling portion 191. A second clamping portion 182 protrudes from the cover body portion and is clamped to the second buckling portion 191. When the cover 18 simultaneously closes multiple concave spaces, to further enhance clamping strength between the cover 18 and the body portion 17, another second buckling portion 191 may be provided in a central area of the cover body portion (a position corresponding to the spacer plate 19) to enhance clamping between a center of the cover body portion and the body portion 17. One concave space can form one or more portions 11. In the present embodiment, one concave space forms two ports 11, and each two adjacent ports are separated by one partition plate 15.

Specifically, the second clamping portion 182 includes an elastic arm 1821 and a hook 1822 protruding from an end of the elastic arm 1821. The second buckling portion 191 is a first accommodating area 1911 and a second accommodating area 1912 provided on the spacer plate 19. The first accommodating area 1911 accommodates the elastic arm 1821. The second accommodating area 1912 accommodates the hook 1822. The hook 1822 is clamped to a slot wall of the second accommodating area 1912 to clamp the second clamping portion 182 to the spacer plate 19. The first accommodating area 1911 and the second accommodating area 1912 accommodate the elastic arm 1821 and the hook 1822 respectively, preventing the second clamping portion 182 from protruding from the spacer plate 19 to interfere with the fiber optic connector 4 in the port 11.

In the present embodiment, the fiber optic adapter further includes a sleeve 2 and a lock sleeve 3. Ports 11 are provided on the two sides of the adapter body 1. Each two opposite ports 11 on the two sides are connected by a sleeve hole 12. A first end of the sleeve hole 12 protrudes inwards to form a first barb portion 121. In the present embodiment, a first end of the sleeve hole 12 is located in the port 11. An inner wall of a port 11 connected to a second end of the sleeve hole 12 is provided with a sunken lock sleeve clamping area 13. The lock sleeve clamping area 13 may be a hole, a slot or another structure.

The sleeve 2 is configured to align optical fibers 41 extended from two ends of the sleeve 2. The sleeve 2 may be a copper pipe. In order for the sleeve 2 to be mounted in the sleeve hole 12, the sleeve 2 may be provided with a slot in an axis direction to allow the sleeve 2 to be compressed to some extent.

The lock sleeve 3 is injection-molded. The lock sleeve 3 is provided with a through lock hole 31. The lock hole 31 has a same diameter as the sleeve hole 12. The lock sleeve 3 protrudes from an outer wall of the lock hole 31 to form a lock sleeve clamping portion 32. The lock sleeve clamping portion 32 is expandable and compressible in a direction perpendicular to an axis direction of the lock hole 31. A first end of the lock hole 31 protrudes inwards to form a second barb portion 311. When the lock sleeve clamping portion 32 is opened and clamped in the lock sleeve clamping area 13, a second end of the lock hole 31 is joined to the second end of the sleeve hole 12 to accommodate the sleeve 2, and the two ends of the sleeve 2 are confined through the first barb portion 121 and the second barb portion 311 respectively.

Since the lock sleeve 3 has a lock sleeve clamping portion 32 which can be opened and compressed, the lock sleeve 3 can be pushed inwardly from outside of the port 11 into the sleeve hole 12. When the lock sleeve clamping portion 32 enters the sunken lock sleeve clamping area 13, the lock sleeve clamping portion 32 can be opened and clamped to the lock sleeve clamping area 13, and the lock hole 31 can be aligned with the sleeve hole 12 without hot pressing, welding or the like. The sleeve hole 12 is provided with the first barb portion 121 and the lock hole 31 of the lock sleeve 3 is provided with the second barb portion 311. One end of the sleeve 2 can be placed in the lock hole 31 or the sleeve hole 12 in advance. While the lock sleeve 3 is being pressed in, another end of the sleeve 2 is gradually inserted into the sleeve hole 12 or the lock hole 31. When the sleeve hole 12 is aligned with the lock hole 31, the two ends of the sleeve 2 are confined by the first barb portion 121 and the second barb portion 311 respectively, completely locked in the sleeve hole 12 and the lock hole 31, and thus locked in the adapter body 1.

The fiber optic adapter of the present disclosure uses the lock sleeve 3 to lock the sleeve 2. While being pressed in, the sleeve 2 is not pressed by the first barb portion 121 or the second barb portion 311 and does not affect precision of the sleeve 2. Hot pressing or welding is not required in the assembling process of the sleeve 2, and the sleeve 2 may be assembled by a cold assembling process. The cold assembling process is simple and easy, does not affect other components, and improves the quality of the fiber optic adapter. Also, the adapter body 1 can be integrally formed at the sleeve hole 12, improving the structural strength of the adapter body 1.

Figure 8:
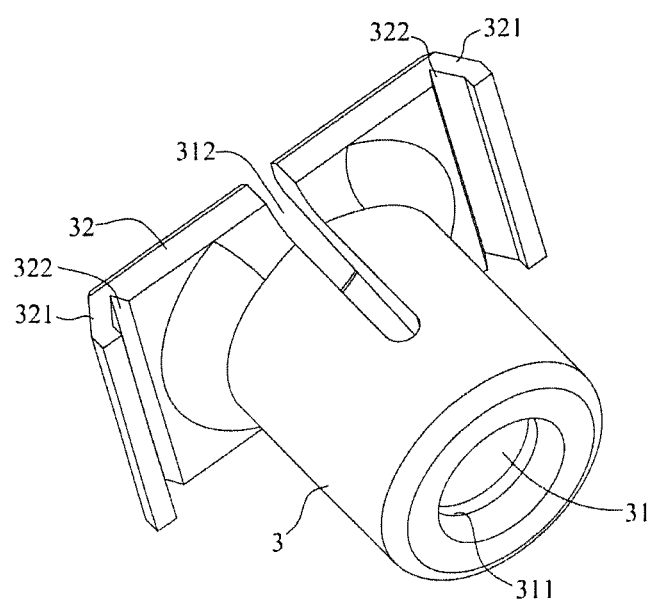
FIG. 8 is a structural diagram of the lock sleeve of the fiber optic adapter according to the present disclosure.

To allow the lock sleeve clamping portion 32 to be expandable and compressible in the direction perpendicular to the axis direction of the lock hole 31, as illustrated in FIG. 8, in the present embodiment, an end of the lock sleeve clamping portion 32 is provided with a tilt arm 321 in a direction tilting away from the axis direction of the lock hole 31. The tilt arm 321 is capable of keeping opened and compressed. The tilt arm 321 can be deformed inwardly when subjected to pressure in a lateral direction and can be recovered when the space allows so that the lock sleeve clamping portion 32 can be clamped in the lock sleeve clamping area 13. In the present embodiment, an outer end of the tilt arm 321 slants to the second barb portion 311. The lock sleeve 31 is pressed into the port 11 from the second barb portion 311 to the sleeve hole 12, and therefore, when the outer end of the tilt arm 321 slants to the second barb portion 311, an inverse buckle can be formed, effectively preventing the lock sleeve 3 from coming out of the lock sleeve clamping area 13. To facilitate bending of the tilt arm 321, the lock sleeve clamping portion 32 is provided with a bending slot 322 at a turning of an inner end of the tilt arm 321. Side walls of the bending slot 322 do not press each other when the tilt arm 322 is bent, facilitating the bending of the tilt arm 321.

In addition to the above method of configuring the tilt arm 321, in the present embodiment, a partition slot 312 may also be arranged inwards from an end of the lock hole 31. The lock sleeve clamping portion 32 is located on an outer wall corresponding to the partition slot 312. The outer walls on two sides of the partition slot 312 close inwards when the lock sleeve clamping portion 32 is pressed. The provided partition slot 312 allows the outer walls on the two sides of the partition slot 312 to close inwards, thereby allowing the lock sleeve clamping portion 32 to move inwards and open outwards. Moreover, a rigidity of the lock sleeve 3 can be adjusted by adjusting a length of the partition slot 312, i.e., abilities of the lock sleeve clamping portion 32 to be compressed and to keep open are adjusted. When the length of the partition slot 312 is longer, the lock sleeve clamping portion 32 can be compressed more easily. When the length of the partition slot 312 is shorter, the lock sleeve clamping portion 32 cannot be easily compressed and can keep open more easily.

The configuration in which the lock sleeve 3 is provided with the partition slot 312 may be combined with the configuration in which the lock sleeve clamping portion 32 is provided with the tilt arm 321, so that the lock sleeve clamping portion 32 can be compressed and opened by two structures and thus a structural reliability can be further ensured.

In the present embodiment, the lock sleeve clamping portion 32 is located at the second end of the lock hole 31, and the side wall of the port 11 connected to the second end of the sleeve hole 12 is provided with the corresponding lock sleeve clamping area 13. After clamped to the lock sleeve clamping area 13, the lock sleeve clamping portion 32 can fix the lock sleeve 3 directly from the second end of the lock hole 31, so that the second end of the lock hole 31 can be securely joined to the second end of the sleeve hole 12. To further keep the lock sleeve 3 docked to the sleeve hole 12, the inner wall where the second end of the sleeve hole 12 is located is adapted to a surface of the lock sleeve clamping portion 32 near the sleeve hole 12. In the present embodiment, the inner wall where the second end of the sleeve hole 12 is located and the surface of the lock sleeve clamping portion 32 near the sleeve hole 12 are both flat surfaces. The inner wall where the second end of the sleeve hole 12 is located is perpendicular to an axis direction of the sleeve hole 12. After the sleeve clamping portion 32 is clamped to the lock sleeve clamping area 13, the surface of the lock sleeve clamping portion 32 near the sleeve hole 12 completely abuts against the inner wall where the second end of the sleeve hole 12 is located, and the entire flat surface can stably support the lock sleeve 3 to maintain stability of the lock sleeve 3.

In the present embodiment, lock sleeve clamping portions 32 are arranged symmetrically on two sides of the lock sleeve 3, so that the two sides of the lock sleeve 3 are uniformly subjected to forces, further ensuring that the lock sleeve 3 is securely docked to the sleeve hole 12. The end of the lock sleeve clamping portion 32 may be arranged in a straight line. The lock sleeve clamping area 13 is a bar-shaped slot. After the lock sleeve clamping portion 32 is clamped to the lock sleeve clamping area 13, the sleeve clamping portion 32 is prevented from rotating and the entire sleeve clamping portion 32 is uniformly subjected to forces.

The present disclosure provides a fiber optic adapter for proofing dust and light. The fiber optic adapter includes an adapter body and a lightproof plate assembly. The adapter body includes a body portion and a cover. The body portion has a concave space provided with openings in two directions. The cover is engaged to the body portion and closes one opening of the concave space to form a port provided with one opening. A plurality of ports are provided on two sides of the adapter body. The ports are used for connecting to fiber optic connectors. The lightproof plate assembly includes a lightproof plate capable of closing and opening the port. Each two adjacent ports on a same side share one lightproof plate. A first end of the lightproof plate is provided with a rotation shaft. Two adjacent ones of the ports sharing one lightproof plate are paired ports. Each of opposite inner walls of the paired ports is provided with a rotation slot adapted to the rotation shaft. The lightproof plate rotates around the rotation shaft to open or close the paired ports. The rotation slot is provided from a side of the body portion facing the cover to a direction away from the cover. The cover covers the rotation slot. Each concave space has two openings, and when the cover covers one of the two openings from outside to form a port, space inside the port is not affected. The lightproof plate can prevent dust and light. When the lightproof plate is mounted, the lightproof plate can be loaded through the opening capable of being closed by the cover, and then the cover and the body portion are engaged to close the opening. The mounting process is simple. The cover and the body portion are assembled by engagement. Such mounting is simple, enables the cover to be securely fixed to the body portion without additional fixed structures. In addition, one lightproof plate is used to shield two ports, and there is no need to provide an individual lightproof plate for each port any more, reducing the number of lightproof plates. More importantly, such configuration reduces assembly time of the fiber optic adapter, improves the assembly efficiency, and greatly reduces the costs of manual assembly.

The above is merely preferred embodiments of the present disclosure. Those of ordinary skill in the art will make modifications to embodiments and the application scope according to the present disclosure. The content of this specification is not to be construed as limiting the present disclosure.

What is claimed is:

1. A fiber optic adapter for proofing dust and light, comprising: an adapter body and a lightproof plate assembly, wherein the adapter body comprises:
   a body portion, wherein the body portion is recessed to form a concave space provided with openings in two directions; and
   a cover, which is engaged to the body portion and closes one of the openings of the concave space to form a port provided with an opening, wherein a plurality of ports are disposed opposite on two sides of the adapter body and the port is configured to connect to an fiber optic connector; and
   wherein the lightproof plate assembly comprises a lightproof plate configured to open and close respective two adjacent ones of the plurality of ports on a same side of the adapter body, the respective two adjacent ports share the lightproof plate, a first end of the lightproof plate is provided with a rotation shaft, the respective two adjacent ports are paired ports, each of opposite inner walls of the paired ports are provided with a rotation slot adapted to the rotation shaft, the lightproof plate rotates around the rotation shaft to open or close the paired ports, the rotation slot is formed on the body portion, and the cover covers the rotation slot,
   wherein a through slot running through the lightproof plate is provided from the first end of the lightproof plate towards inside the lightproof plate, the through slot is transversely provided with a sleeve shaft, the through slot is divided by the sleeve shaft into a limiting slot closer to the first end of the lightproof plate and a limiting hole away from the first end of the lightproof plate,
   wherein the lightproof plate assembly comprises an elastic needle, the elastic needle has two elastic ends and a middle part, the middle part of the elastic needle is arc-shaped and is sleeved on the sleeve shaft and accommodated in the limiting slot, one of the two elastic ends of the elastic needle protrudes from the limiting hole and abuts against the lightproof plate, and the other one of the two elastic ends of the elastic needle abuts against the inner wall of the adapter body, such that the respective two adjacent ports are closed by the lightproof plate.

2. The fiber optic adapter of claim 1, wherein the respective two adjacent ports are separated by a partition plate, the partition plate is provided with an avoiding area, a middle part of the lightproof plate is located at the partition plate, two sides of the lightproof plate are respectively located inside the respective two adjacent ports, and the avoiding area is adapted to a motion track of an end of the lightproof plate.

3. The fiber optic adapter of claim 1, wherein the through slot is located at a position corresponding to the partition plate, and the inner wall of the adapter body is provided with respective accommodating slots at a position of the elastic end and a position of the sleeve shaft.

4. The fiber optic adapter of claim 1, wherein the fiber optic connector is provided with a compressible and recoverable protrusion; and
   a side wall of the port is provided with a recess for accommodating the protrusion, and the recess does not go through the side wall of the port.

5. The fiber optic adapter of claim 2, wherein the fiber optic connector is provided with a compressible and recoverable protrusion; and
   a side wall of the port is provided with a recess for accommodating the protrusion, and the recess does not go through the side wall of the port.

6. The fiber optic adapter of claim 3, wherein the fiber optic connector is provided with a compressible and recoverable protrusion; and
   a side wall of the port is provided with a recess for accommodating the protrusion, and the recess does not go through the side wall of the port.

7. The fiber optic adapter of claim 4, wherein the recess is located on an inner wall of the body portion opposite to the cover.

8. The fiber optic adapter of claim 4, wherein two opposite ones of the plurality of ports on the two sides of the adapter body are connected by a sleeve hole, a first end of the sleeve hole protrudes inwards to form a first barb portion, and an inner wall of a port connected to a second end of the sleeve hole is provided with a sunken lock sleeve clamping area;
   the fiber optic adapter further comprises a sleeve and a lock sleeve, the sleeve is configured to align with an optical fibers extending from two ends of the sleeve respectively, the lock sleeve is provided with a through lock hole, the through lock hole has a same diameter as the sleeve hole, the lock sleeve protrudes at an outer wall of the through lock hole to form a lock sleeve clamping portion, the lock sleeve clamping portion is openable and compressible in a direction perpendicular to an axis direction of the lock hole, and a first end of the through lock hole protrudes inwards to form a second barb portion; and
   when the lock sleeve clamping portion is opened and clamped in the lock sleeve clamping area, a second end of the through lock hole is docked to the second end of the sleeve hole to accommodate the sleeve, and the two ends of the sleeve are respectively confined through the first barb portion and the second barb portion.

9. The fiber optic adapter of claim 8, wherein an end of the lock sleeve clamping portion is provided with a tilt arm inclined with respect to the axis direction of the lock hole, and the tilt arm is capable of keeping open or compressed.

* * * * *